C. H. WHIPPLE.
MACHINE FOR MANUFACTURING TWIST DRILLS AND OTHER ARTICLES.
APPLICATION FILED APR. 23, 1914.

1,254,753.

Patented Jan. 29, 1918.
15 SHEETS—SHEET 1.

Witnesses:
Thomas J. Byrne
William P. Johnson

Charles H. Whipple, Inventor
By his Attorneys
Kerr, Page, Cooper & Hayward

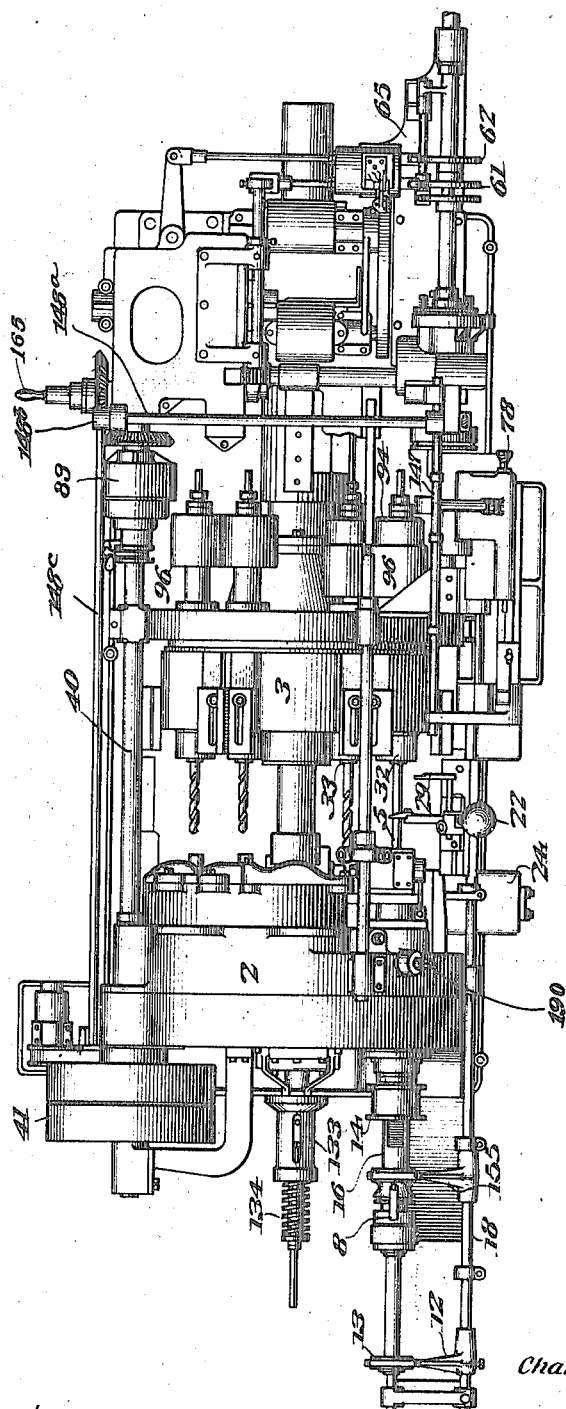

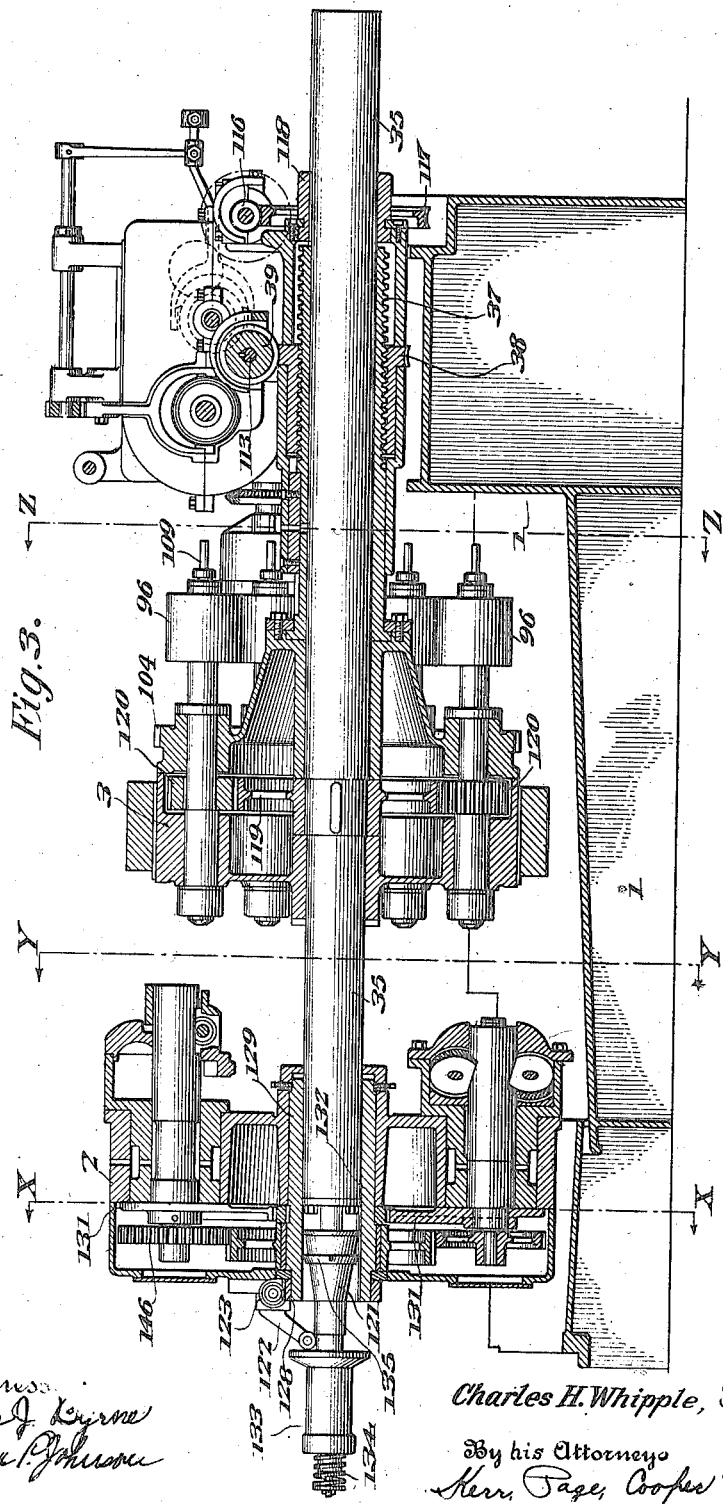

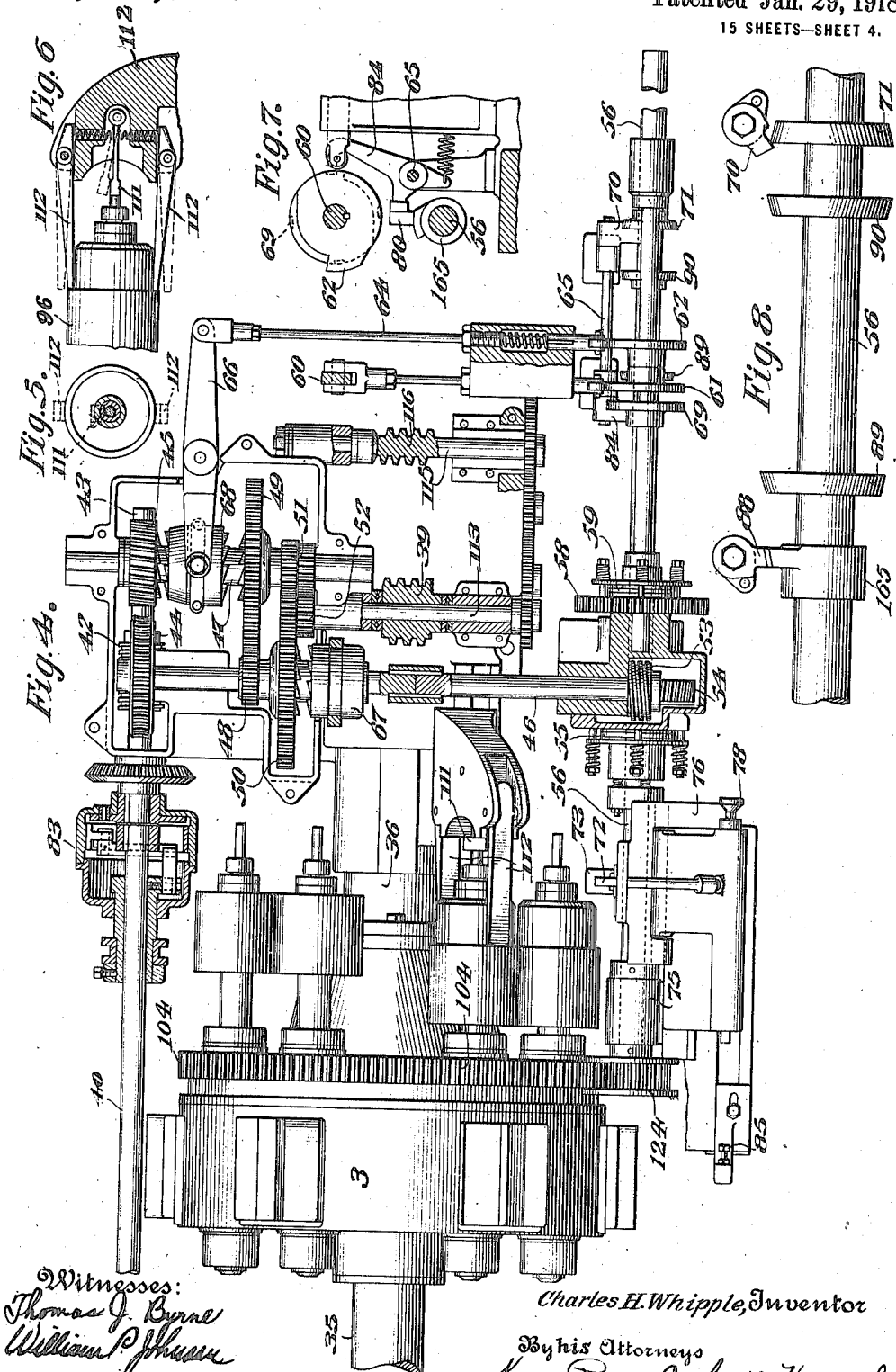

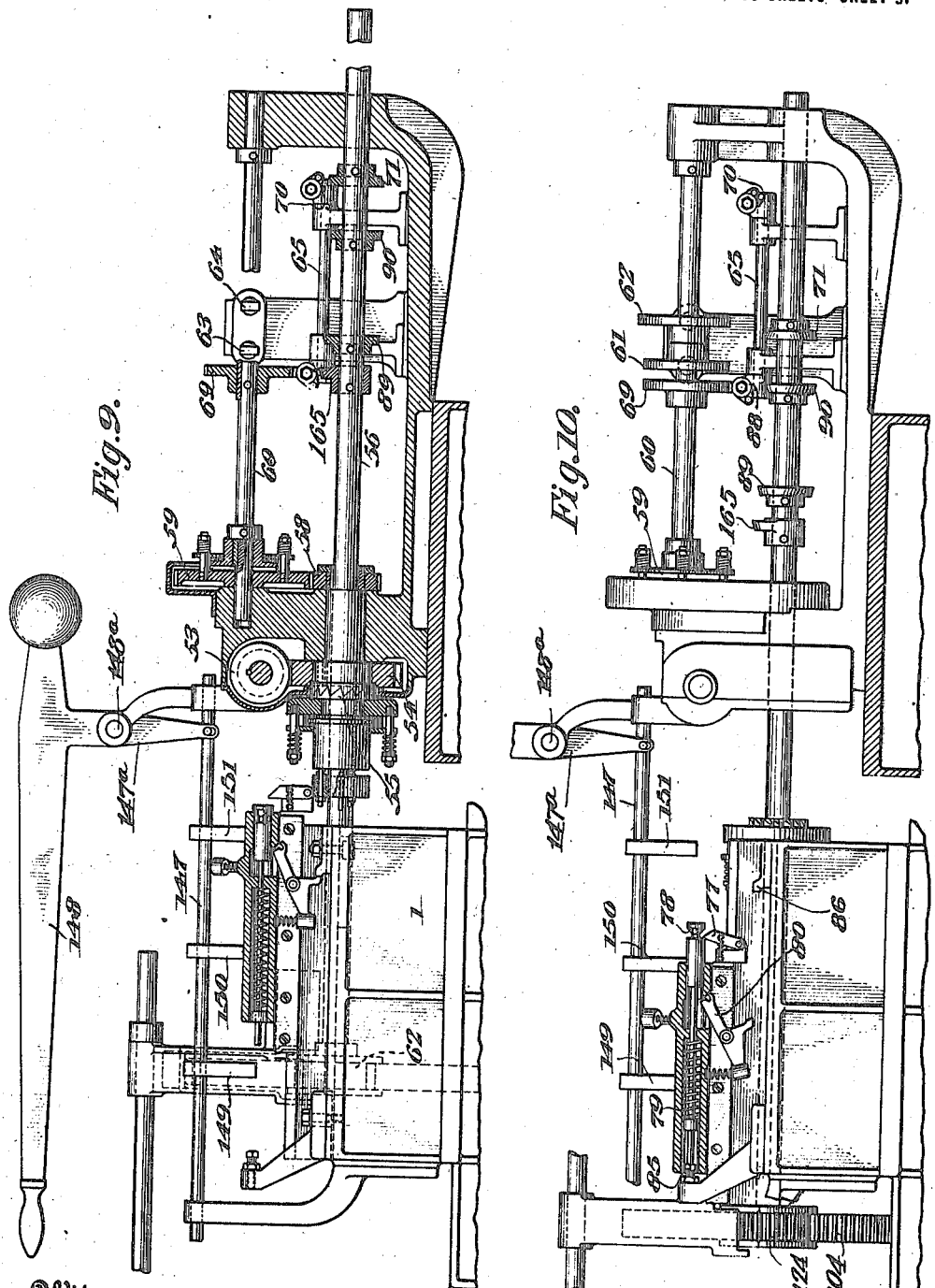

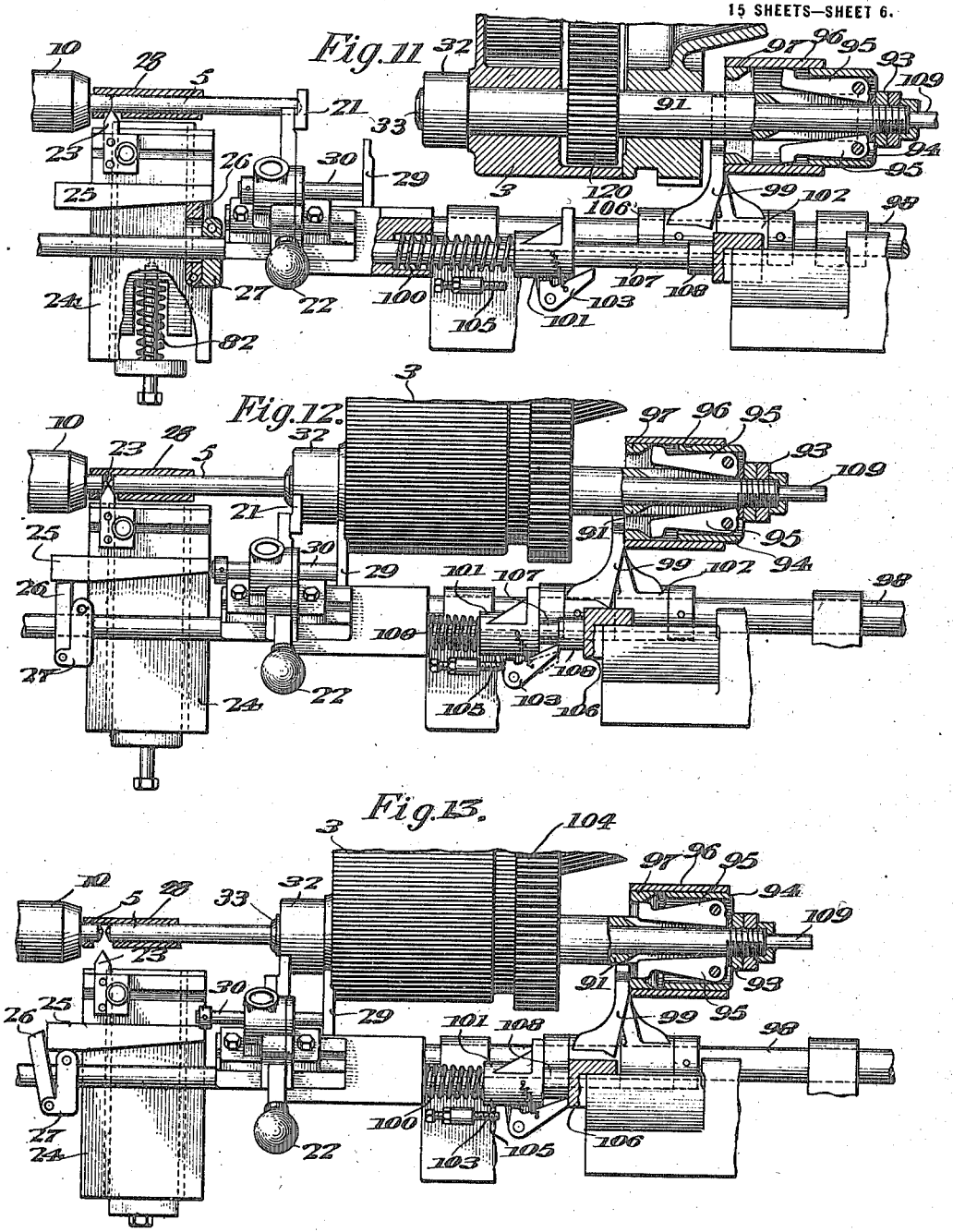

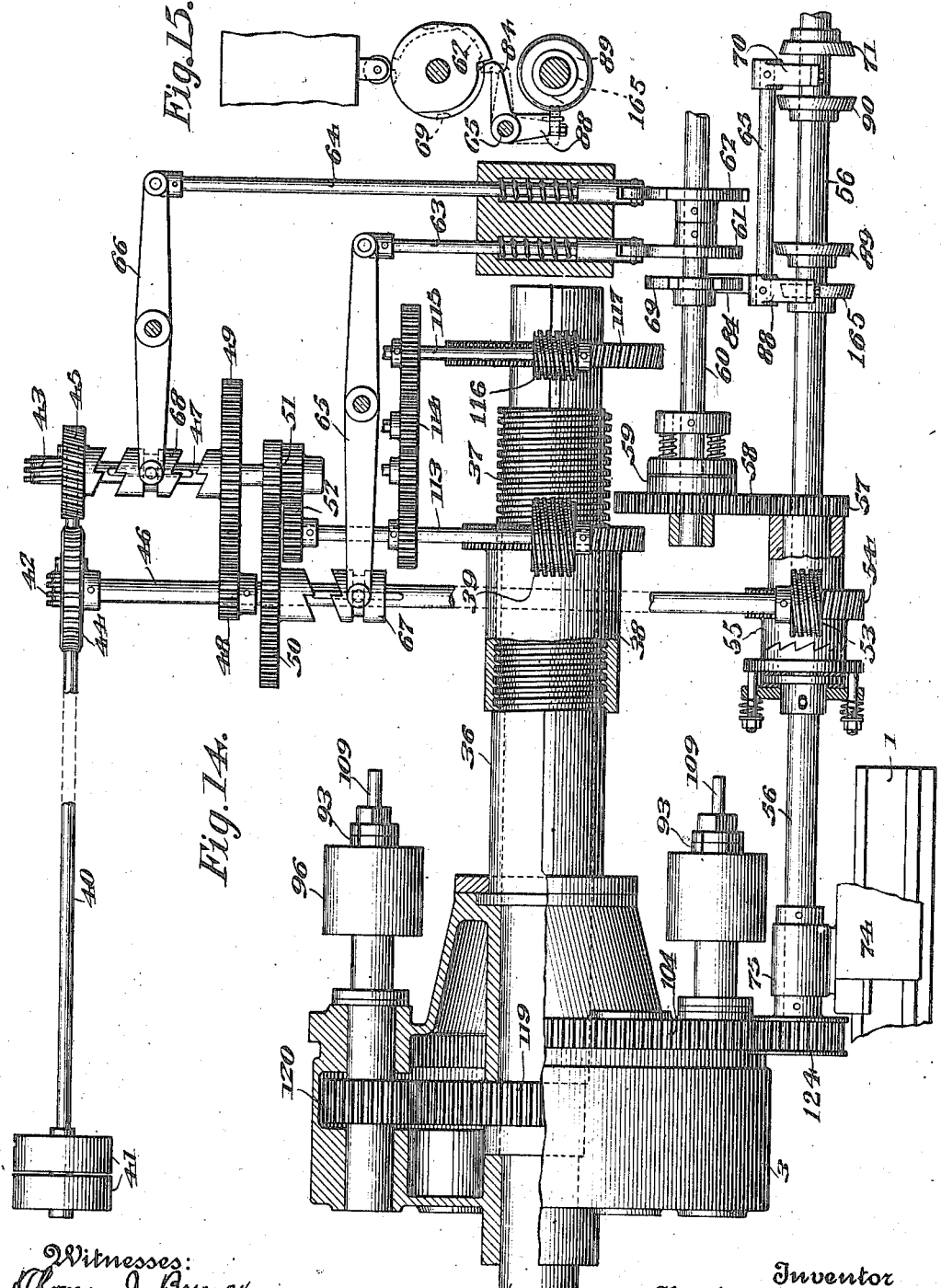

C. H. WHIPPLE.
MACHINE FOR MANUFACTURING TWIST DRILLS AND OTHER ARTICLES.
APPLICATION FILED APR. 23, 1914.
1,254,753.
Patented Jan. 29, 1918.
15 SHEETS—SHEET 8.
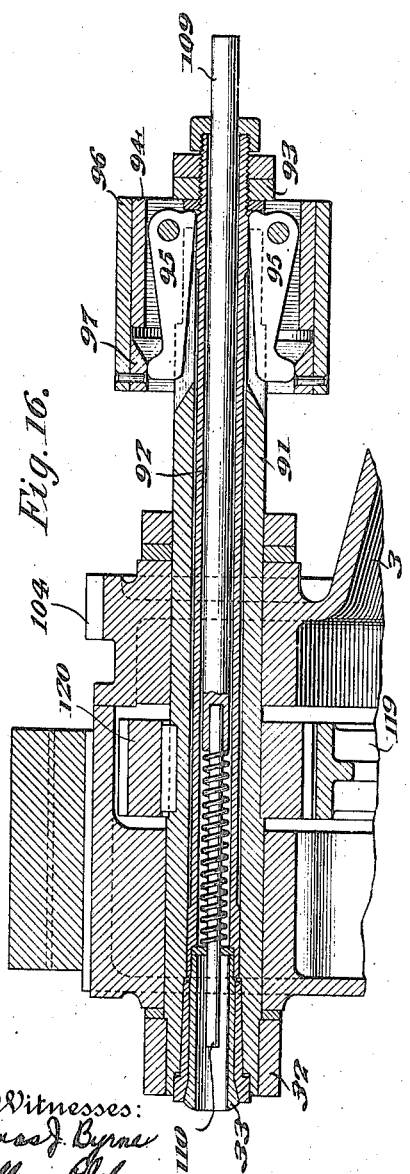
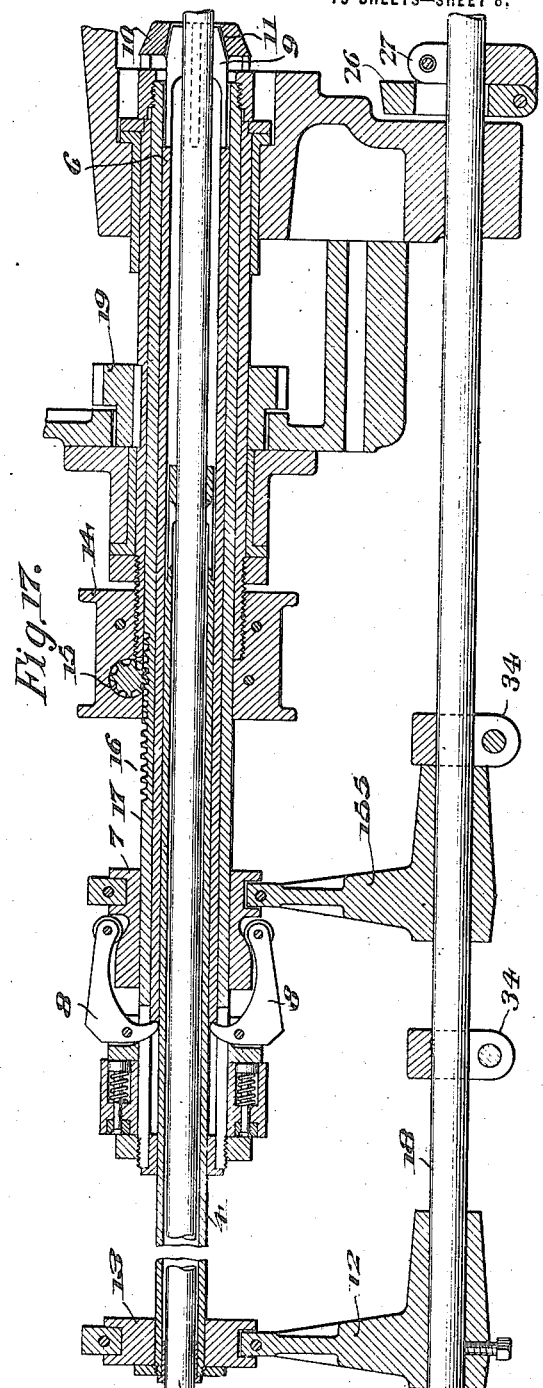
Witnesses:
Thomas J. Byrne
William P. Johnson
Inventor
Charles H. Whipple,
By his Attorneys
Kerr, Page, Cooper & Hayward.

C. H. WHIPPLE.
MACHINE FOR MANUFACTURING TWIST DRILLS AND OTHER ARTICLES.
APPLICATION FILED APR. 23, 1914.
1,254,753.
Patented Jan. 29, 1918.
15 SHEETS—SHEET 9.
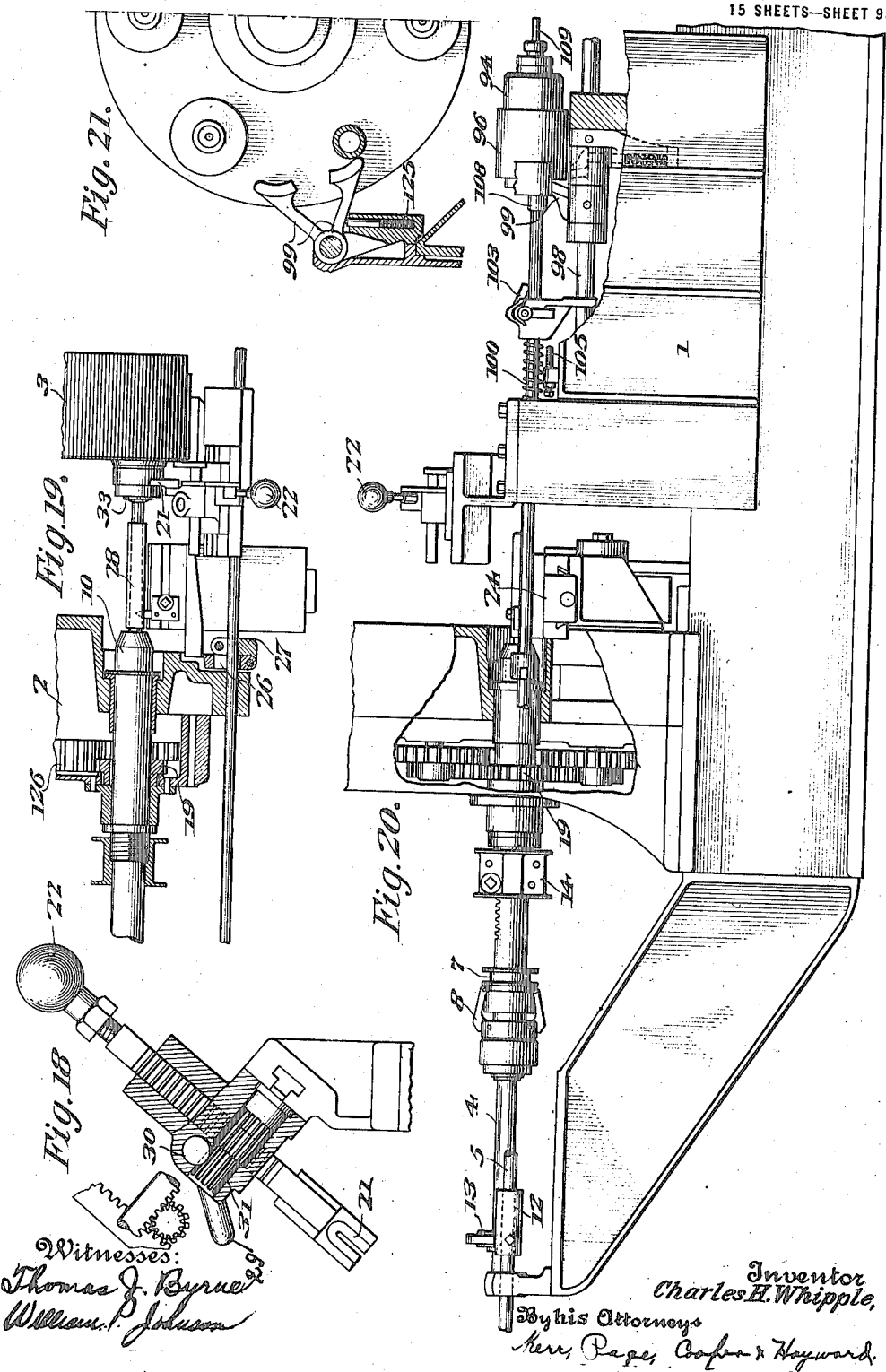

C. H. WHIPPLE.
MACHINE FOR MANUFACTURING TWIST DRILLS AND OTHER ARTICLES.
APPLICATION FILED APR. 23, 1914.

1,254,753.

Patented Jan. 29, 1918.
15 SHEETS—SHEET 10.

Witnesses:
Thomas J. Byrne
William P. Johnson

Charles H. Whipple, Inventor
By his Attorneys
Kerr, Page, Cooper & Hayward.

C. H. WHIPPLE.
MACHINE FOR MANUFACTURING TWIST DRILLS AND OTHER ARTICLES.
APPLICATION FILED APR. 23, 1914.
1,254,753.
Patented Jan. 29, 1918.
15 SHEETS—SHEET 11.
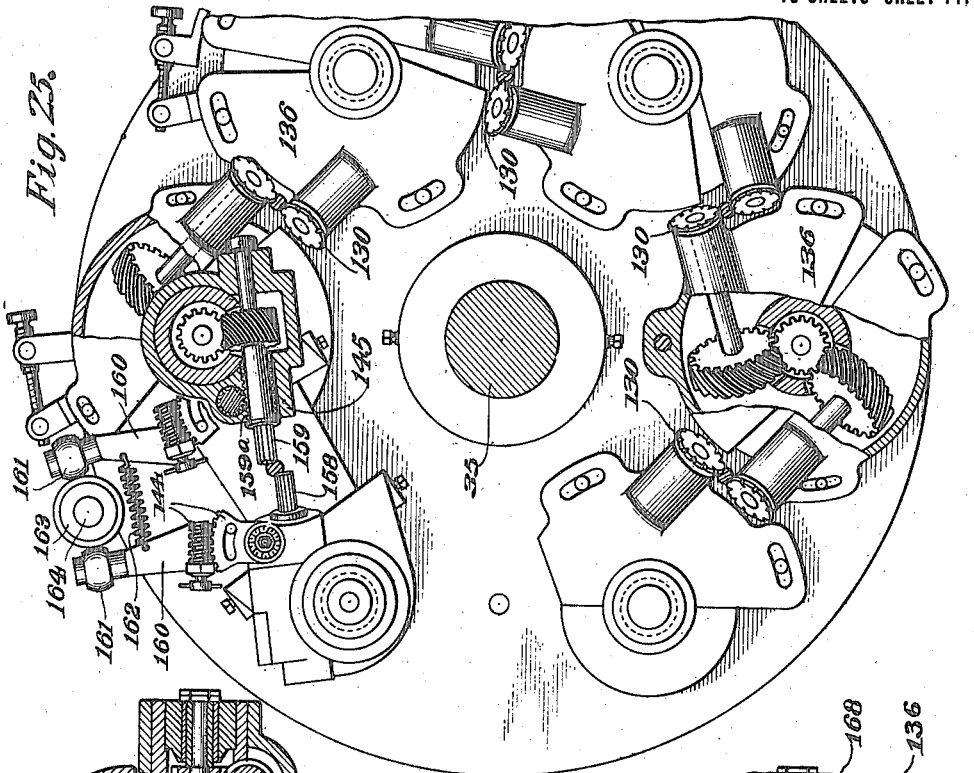
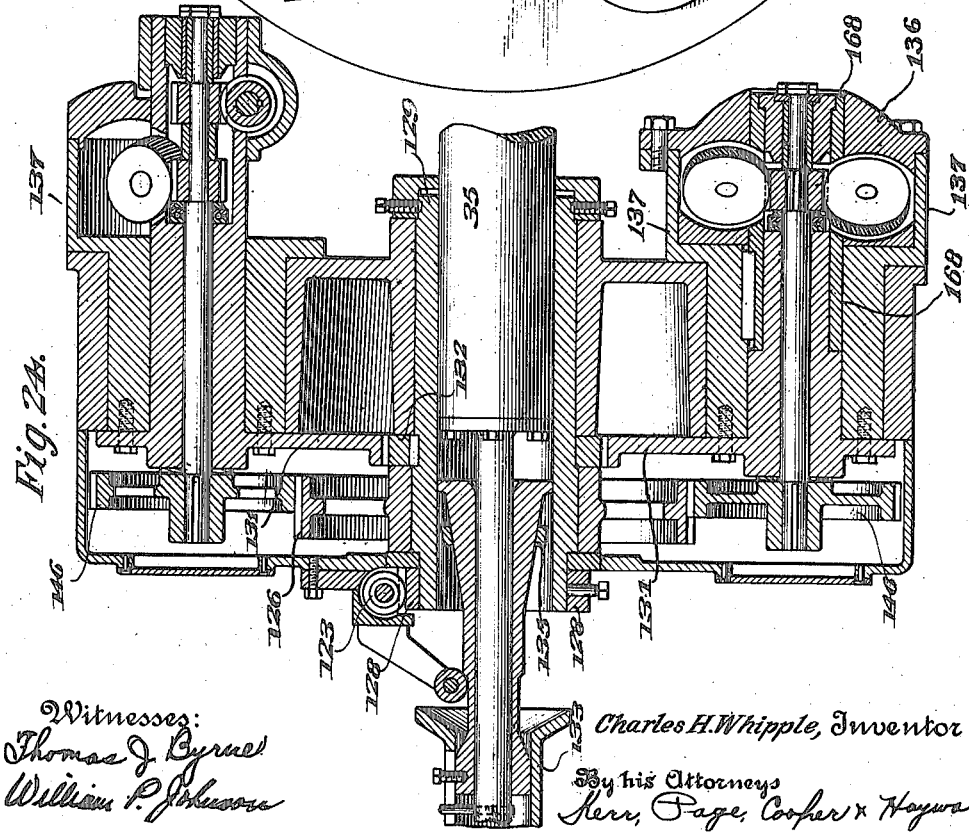

C. H. WHIPPLE.
MACHINE FOR MANUFACTURING TWIST DRILLS AND OTHER ARTICLES.
APPLICATION FILED APR. 23, 1914.

1,254,753. Patented Jan. 29, 1918.
15 SHEETS—SHEET 12.

Witnesses:
Thomas J. Byrne
William P. Johnson

Inventor
Charles H. Whipple
By his Attorneys
Kerr, Page, Cooper & Hayward.

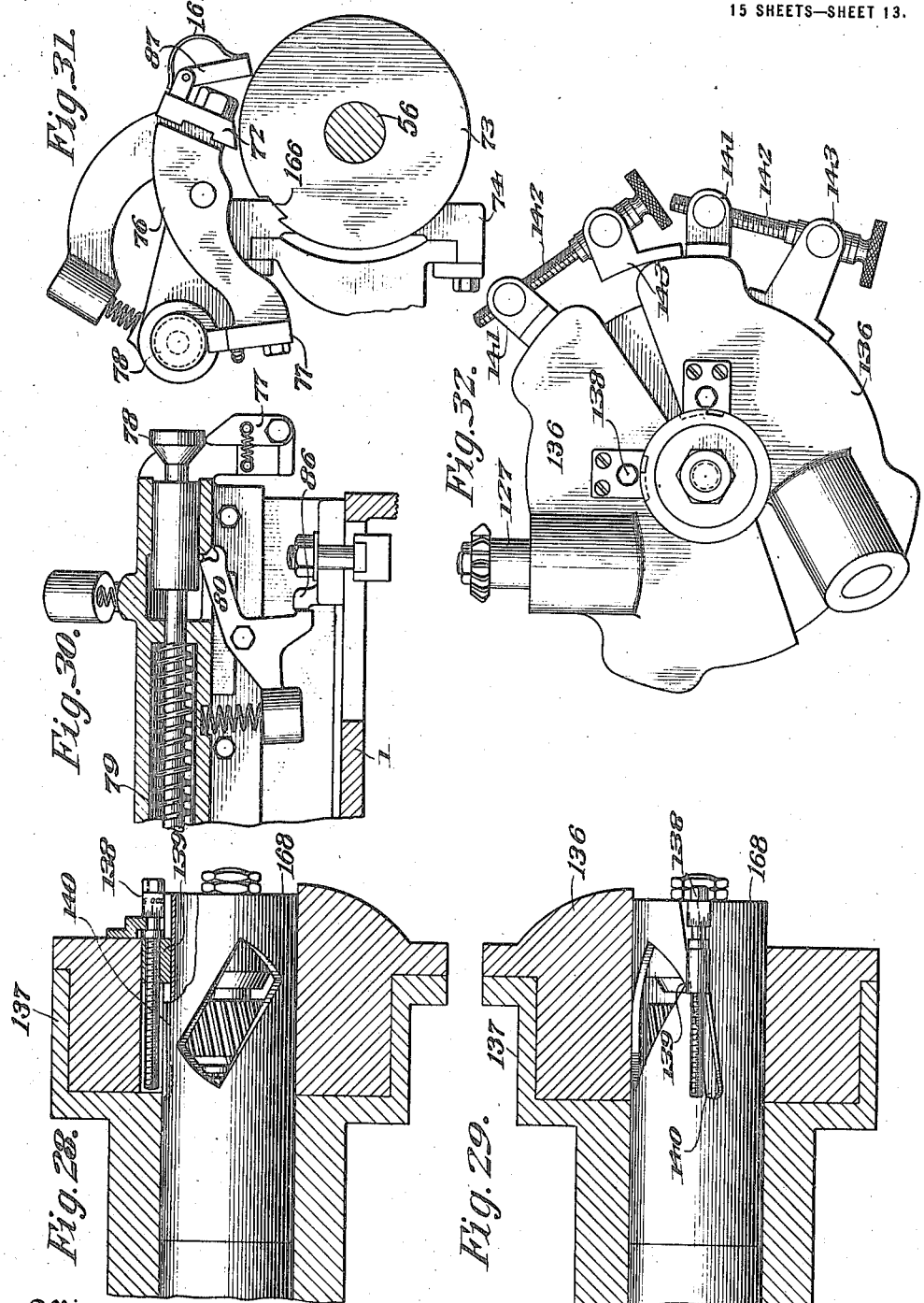

C. H. WHIPPLE.
MACHINE FOR MANUFACTURING TWIST DRILLS AND OTHER ARTICLES.
APPLICATION FILED APR. 23, 1914.

1,254,753.

Patented Jan. 29, 1918.
15 SHEETS—SHEET 14.

Witnesses:
Thomas J. Byrne
William P. Johnson

Charles H. Whipple, Inventor
By his Attorneys
Kerr, Page, Cooper & Hayward.

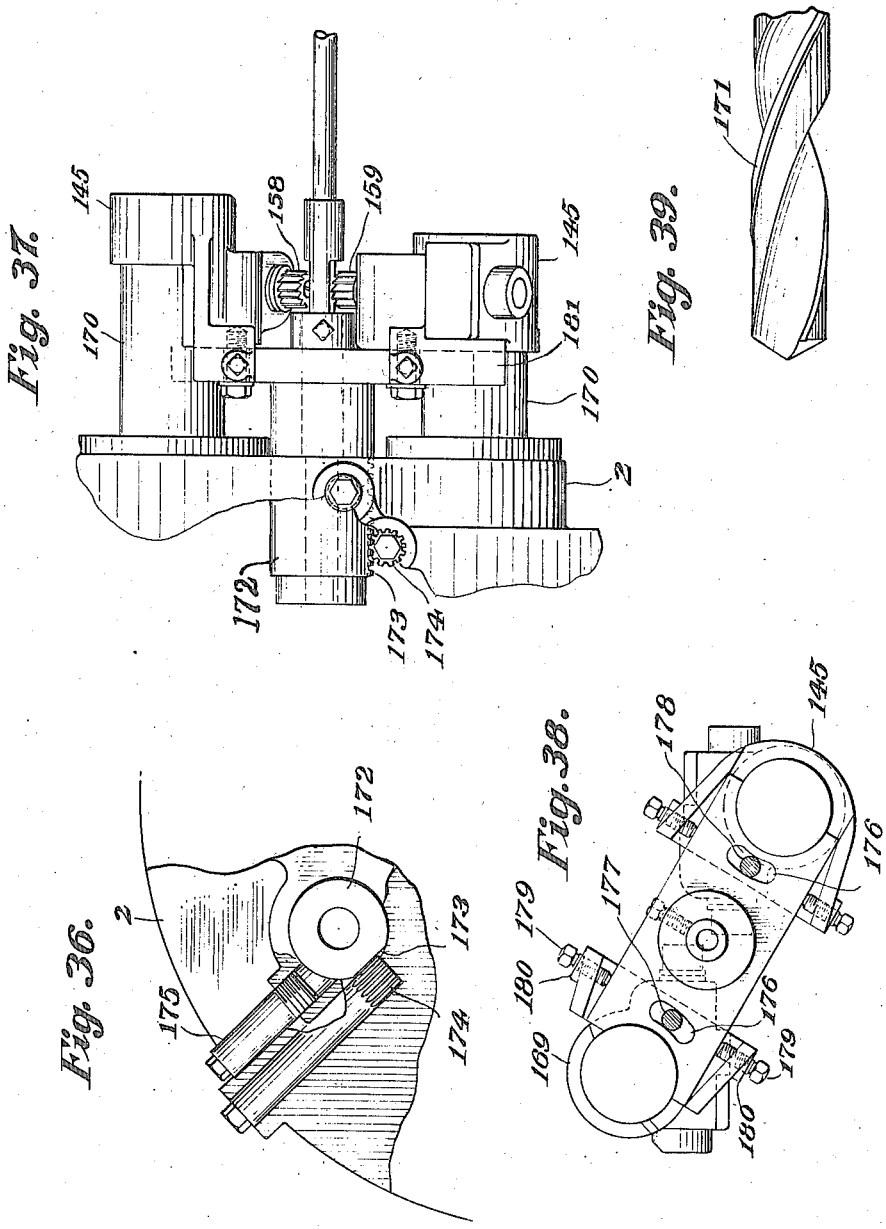

UNITED STATES PATENT OFFICE.

CHARLES H. WHIPPLE, OF WALKERVILLE, ONTARIO, CANADA, ASSIGNOR TO A. D. WILT, JR., OF DETROIT, MICHIGAN.

MACHINE FOR MANUFACTURING TWIST-DRILLS AND OTHER ARTICLES.

1,254,753. Specification of Letters Patent. Patented Jan. 29, 1918.

Application filed April 23, 1914. Serial No. 833,832.

*To all whom it may concern:*

Be it known that I, CHARLES H. WHIPPLE, a citizen of the United States, residing at Walkerville, in the Province of Ontario and Dominion of Canada, have invented certain new and useful Improvements in Machines for Manufacturing Twist-Drills and other Articles, of which the following is a full, clear, and exact description.

This invention resides in an automatic machine which is primarily designed for the manufacture from blanks or from a bar of raw stock of twist drills, and which although capable of making reamers, taps and many other like articles is herein described mainly as an apparatus for the specific purpose of making twist drills.

The invention involves improvements in the construction and operation of a machine of this character which is made the subject of, and illustrated in, a patent granted to Abram D. Wilt, Jr., on December 6, 1910, No. 978,097.

In the said patented machine the several operations of cutting the stock and fashioning and finishing the drills are performed successively, there being a plurality of work stations at which the work in its different stages is performed simultaneously. In other words, there is provided a tool holder or head having a plurality of tools, and a blank carrier or turret for holding the severed sections of stock, associated with the same, and provided with chucks or devices for holding the blanks in position to be operated on at the tool stations. The blanks, after being turned and severed from the stock, are received and held by the chucks and by the rotation of the blank carrier are carried from station to station where the work upon them is performed.

In this way, as all the chucks of the blank carrier are provided with blanks, a different stage in the work is being simultaneously carried on at each tool station, and then, by the rotation of the blank carrier the blanks are advanced to the next tool station for the next succeeding operation, or expelled from the machine, as the case may be.

The machine in question, moreover, differs from others in the prior art by the fact that there is a correlation between the work performed at one station and that performed at the next succeeding station. That is, in the making of such articles as twist drills, reamers and the like, if the operation involves the dressing or shaping of the blank and the cutting of the same from the bar of stock, and the second operation involves the milling of the grooves, the latter operation will be one requiring a considerable length of time as compared with the former. But to correlate the two, the milling of the grooves is divided up into a plurality of stages or operations, the first milling being a comparatively shallow cut at one station, followed by successively deeper cuts at the succeeding stations until the proper depth of cut is secured.

A machine so organized as to divide up the work in stages is capable of turning out a great many drills in a short space of time, but it is essential that the arrangement be such that there is maintained between the work performed at the successive stations a certain definite relation. That is, if the milling cutters at one station are designed to cut the grooves to a predetermined depth, and then the work is to be carried on to the next station where the grooves are to be cut slightly deeper, it is essential that the tools at such succeeding station will traverse in the same time precisely the same path, and so on for the succeeding stations where the work is performed upon the same path.

The general object of the machine, therefore, is to cut blanks from a continuous bar of stock and perform the various cuts and operations thereon at succeeding tool stations, and finally eject from the machine the finished product, and the invention, subject of this application, consists in improvements on said machine, the nature and purpose of which will be described in detail by reference to the accompanying drawings.

The objects of my invention may be accomplished by the use of the apparatus illustrated in these drawings as the best embodiment of the same of which I am now aware.

Fig. 2 is a top plan view of the same,

Fig. 3 is a sectional elevation of the principal part of Fig. 1.

Fig. 4 is an enlarged plan of the blank carrier and a sectional plan of some of the connected parts.

Fig. 5 is an end view of a portion of the mechanism for operating the clutches for the blanks.

Fig. 6 is a longitudinal section of the same.

Fig. 7 is a detail, on an enlarged scale, of a cam operating lock and release for shifting the clutches in a gear box.

Fig. 8 is an enlarged detail in elevation of a pawl operating mechanism for controlling the motion of the blank carrier.

Fig. 9 is an enlarged detail, in sectional elevation, of the means for locking and releasing the cam operating shaft and the rotating shaft for the blank carrier.

Fig. 10 is a similar view of the same parts, with the blank carrier rotating shaft in a different position.

Figs. 11, 12, 13, and 14 are enlarged illustrative diagrams of apparatus shown to exhibit the relations and operations of the parts rather than their specific construction.

Fig. 15 is an enlarged detail of the cams for operating the blank carriers.

Fig. 16 is an enlarged sectional elevation of the means for ejecting the finished drill and for locking the collet that holds the blank.

Fig. 17 is a plan view of the means for feeding the stock to the machine and holding the same while being cut off.

Fig. 18 is an enlarged detail of the means for limiting the feed of the stock.

Fig. 19 is a top plan view of the parts illustrated in Fig. 11.

Fig. 20 is a view in elevation of the same and other means with parts removed to illustrate the mode of operation.

Fig. 21 is a part sectional view of a portion of the mechanism for gripping in the blank carrier.

Figure 22:
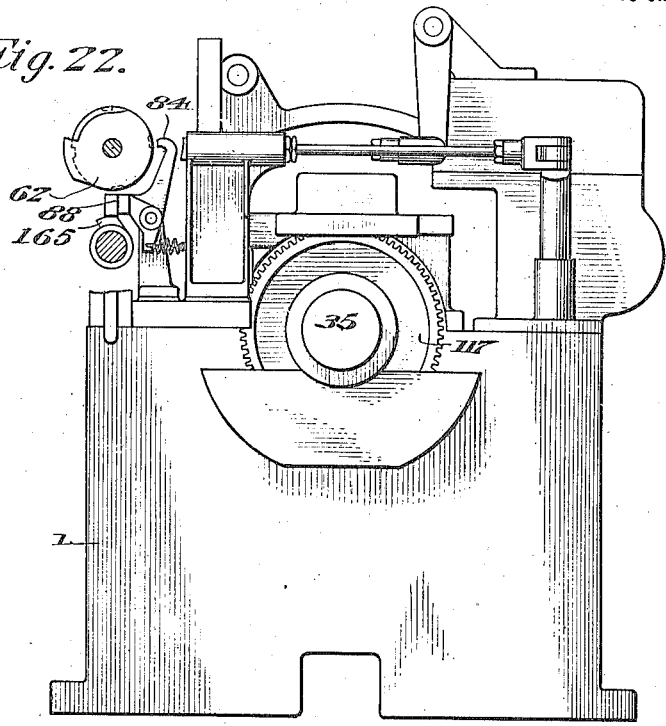

Fig. 22 is an end view of the machine looking from the right.

Figure 23:
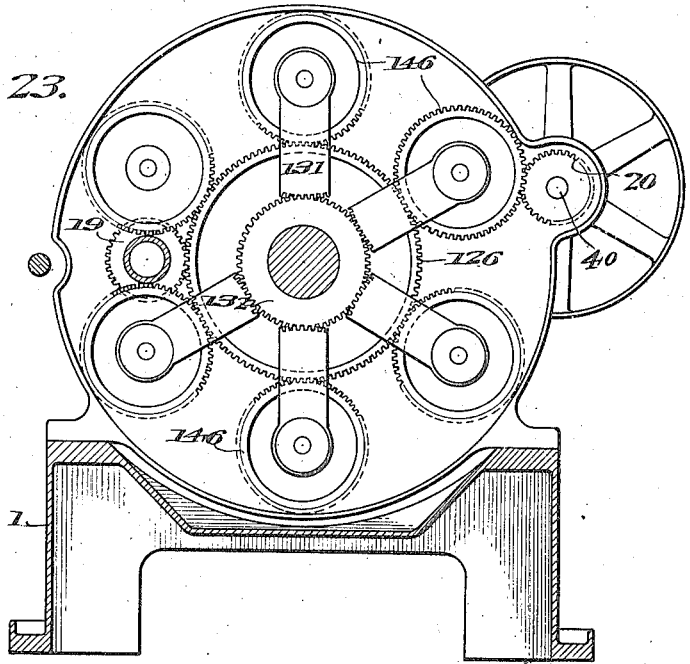

Fig. 23 is a sectional view on the line x—x of Fig. 3.

Fig. 24 is a central longitudinal section of the tool holder or head.

Fig. 25 is a section on the same on line y—y of Fig. 3.

Figure 26:
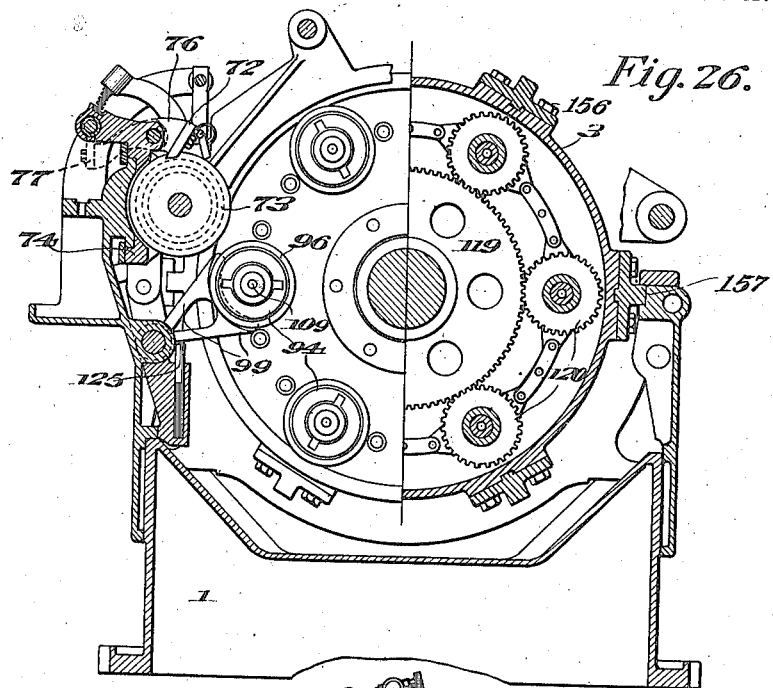

Fig. 26 is a broken section on line z—z of Fig. 3.

Figure 27:
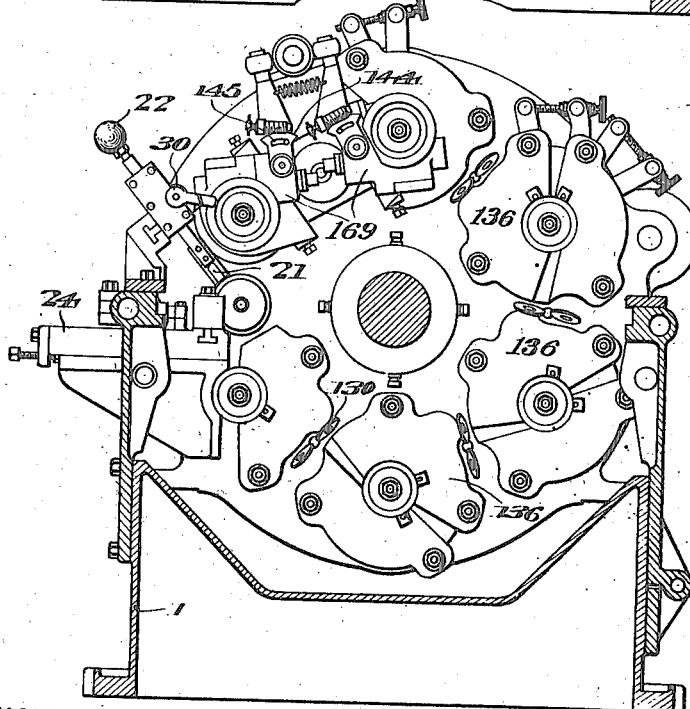

Fig. 27 is a section through the shaft showing in elevation the tool operating devices.

Fig. 28 is an enlarged detail of the means for adjusting and supporting the cutting tools, and also part of the driving mechanism.

Fig. 29 is a similar view showing the parts in a different position.

Fig. 30 is an enlarged detail view in sectional elevation of the means for locking and releasing the indexing mechanism.

Fig. 31 is an enlarged detail view in elevation of the same.

Fig. 32 is an enlarged detail of the tool holding and adjusting devices.

Figure 33:
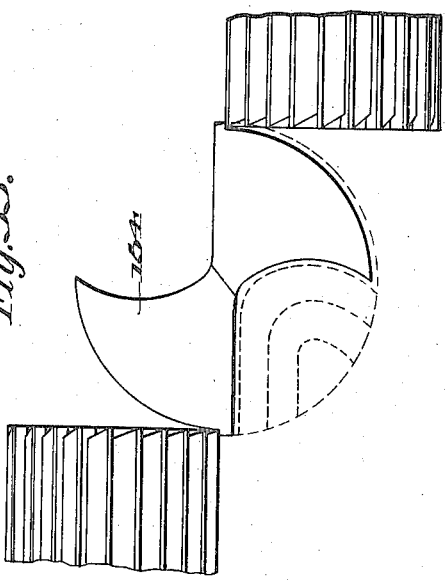

Fig. 33 is an illustrative view of the relieving cutters.

Figure 34:
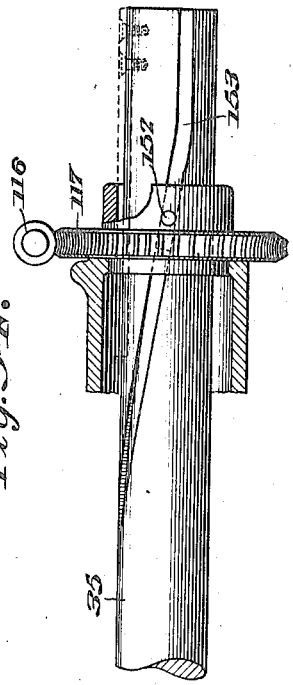

Fig. 34 is an enlarged detail of the mechanism connected with the main operating shaft, showing means for making drills with increased or irregular twist.

Figure 35:
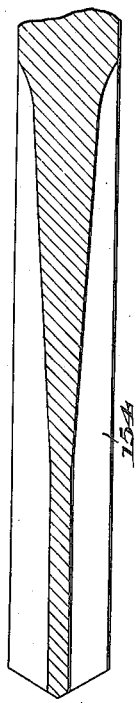

Fig. 35 is a sectional view of a portion of a finished drill.

Fig. 36 is a part sectional detail of the cutter regulating mechanism.

Fig. 37 is a side elevation of the complete mechanism for this purpose.

Fig. 38 is an end view of the same.

Fig. 39 is an end and plan view of a finished drill.

In all of the figures of these drawings, corresponding parts are designated by the same numerals.

The machine in general comprises a frame 1 upon which there are mounted a stationary tool holder or head 2, and a rotary reciprocating blank carrier or turret 3, and the other parts designed to move the latter to and fro with respect to the tools, to rotate the same by successive steps, to feed the blanks and to perform the other functions incident to the operation of the machine.

As a matter of convenience in illustration, the construction of the device will be described in the order of the operations performed, as far as possible, beginning with the introduction of the blanks.

In the forward part of the machine, Fig. 17, is a tubular member 4, suitably supported in the line of feed and adapted to receive and frictionally engage the stock 5 in the form of a continuous rod. The tube 6 for operating the chuck or collet 9, by which the stock is clamped and held during the return movement of the member 4, surrounds the latter within the tube 17. The chuck or collet 9 is operated by a sliding collar 7 on the tube 17 through the medium of the bell crank levers 8, and an arm 155, the end of which engages the collar 7, sliding between fixed stops 34 on a reciprocating bar 18. The levers 8 are actuated by a cam on the collar 7, and operate to shift the tube 6 longitudinally in relation to the outer sleeve 10, the latter being provided with a tapering shoulder 11 engaging the collet 9 and clamping the same against the stock bar. The stock holding tube 4 is reciprocated through the medium of an arm 12, the end of which engages a collar 13 on the said tube. These parts are substantially the same as in the prior patent above referred to, but in order to effect a longitudinal adjustment of the entire stock feed mechanism to accommodate drills of different lengths, there is employed a ring 14 screwed to a rotating support and carrying a pinion 15 engaging with a rack tube 16 on the stock feed device. By turning the pinion 15, the position of the shell 17, with reference to the tool holder or head 2, is varied, and the position of stock fed for each drill is accurately determined.

As the means for operating the arm 12 and the controlling device 155, the rod 18 connected with the movable blank carrier is used. In this way a direct pull on the feed shell and tube 4 is secured, and a positive feed of the proper length is accomplished, which, by means of the usual cam drum mechanism, cannot always be assured.

When the stock, by the above described or other suitable means, has been properly advanced and gripped by the chuck or collet 9, it is rotated by the gears 19, 126 and 146 of Fig. 23, arranged in the stationary head and engaging with the gear 20 on the main driving shaft 40 of the machine. The limit of forward movement of the stock is regulated by the auxiliary means illustrated in detail in Figs. 11 to 13 and 18 and 19, which device is used as a supplement to the bar 18 in the performance of this function. This mechanism consists of a sliding bar 21, having a properly cut end, shown in Fig. 18, to receive the pointed end of the stock, and a weight 22 tending to hold the end of the bar normally in the path of the stock at a predetermined distance from the end of the sleeve 10. When the advancing end of the stock encounters the bar 21, it is arrested at precisely the point which determines the length of the blank for a drill.

At a short distance from the end of the sleeve 10, Fig. 11, is a cutting tool 23, mounted on a tool post or sliding block 24 and adapted to be pushed into operative engagement with the stock bar by means of a cam 25, which in turn is operated by a swinging arm 26 pivotally mounted on a block 27 secured to the sliding bar 18. When this latter bar is drawn backward by the corresponding movement of the blank carrier 3, the pivoted arm 26 slides freely in the side of the cam 25, as will be seen from an examination of Fig. 13, but when the bar 18 is advanced the arm 26, by reason of the block 27, is held in a position to slide along the edge of cam 25 and pushes the latter forward against the tension of a spring 82, and with it the block and the cutter 23 which cuts off a blank from the stock.

In practice, a suitably supported guide tube 28, shown in Fig. 19, receives the advancing stock and supports it firmly while it is being cut by the tool 23. It may be stated that the means for turning down the drill stock, when used, should be inserted at this point in lieu of the tube 28, or any other device known in the art may be used for turning and receiving the stock.

During the time that the stock is being cut, the blank carrier is advancing, and, at the proper moment, it comes into engagement with an arm 29 Figs. 11-13 rigidly connected with a sliding rack bar 30, see Fig. 18, which engages a pinion 31 in gear with a rack cut in the bar 21. The bar 30 is thus moved and the bar 21 drawn out of the path of the travel of the stock and the advancing blank carrier and the end of the stock caused to enter the chuck 32, which, by means of a jaw member or collet 33, Fig. 16, is caused to grip the same. In this way, by each forward movement of the carrier 3 a blank is picked up by one of the chucks and, by a rotation and reciprocating motions of said carrier, is moved step by step to each tool or tool station to be operated upon by the instruments thereat.

In illustration of this latter mechanism, reference is most conveniently made to Fig. 14, in which the several parts are shown in operative relation, their specific form being modified in some particulars from that shown in the other figures to better explain their nature and purpose.

The blank carrying device 3 in the general form of a conical support, is rotatably mounted on a shaft 35, together with which it is adapted to reciprocate. A sleeve 36 is secured to the carrier by means of a shouldered end and is provided with a screw thread 37, which engages a nut 38, which, in turn, engages with a worm pinion 39 by means of which said nut is rotated to shift the sleeve 36, and thereby the carrier 3, with the shaft 35.

The to and fro movement of the blank carrier through the operation of the devices above mentioned is secured by means of the gears and clutches shown in the figures under consideration. The shaft 40, with tight and loose pulleys 41, carries two worm pinions 42 and 43 which engage gears 44 and 45. The gear 44 is on a shaft 46, gearing with a spindle 47, carrying the gear 45, through a small pinion 48 on shaft 46 and a large gear 49 on the spindle 47, which is normally free to turn on said spindle.

There is also, a large and loosely mounted gear wheel 50 on the spindle 46 gearing with the pinion 51 fixed to spindle 47, and with the shaft carrying said pinion 51 there also engages a pinion 52 fixed to the spindle 113 of the worm pinion 39. The spindle 46 also carries a worm pinion 53 engaging with a gear 54 on a sleeve loose on shaft 56 and as shown in Fig. 9, connected thereto by a clutch, splined thereto, which for convenience and readiness of explanation is shown as a simple toothed clutch 55 in Fig. 14.

The sleeve carrying the gear 54 is also geared by means of a pinion 57 with one element 58 of a slip clutch 59 on a shaft 60. On the shaft 60 are fixedly mounted two cam wheels 61 and 62 operating spring actuated plungers 63 and 64, connected with rocking levers 65 and 66 that are pivotally connected, respectively, to a clutch 67 fixed to spindle 46 and a clutch 68 keyed to spindle 47. An index wheel 69 with four equidistant indentations or stops, is also, secured to the spindle 60.

The blank carrier 3 carries a gear wheel 104, with which engages a pinion 124 on the shaft 56, and by such means is caused to revolve one sixth of a complete turn for each revolution of the shaft 56. The pinion 124 has flanges which embrace the sides of the gear wheel 61, so that the blank carrier 3 and the shaft 56 move in unison. The pinion 53 revolves continuously, being driven by the shaft or spindle 46 which receives its power directly from the shaft 40 through the worm 42 and gear 44, but the shaft 56 revolves intermittently, operating at the extreme backward movement of the blank carrier by reason of the clutch 55. In practice a safety clutch 83 is employed with the shaft 40 between the pulleys and the worm pinion 42. This is shown in Fig. 4.

As above stated, the index wheel 69 on shaft 60 has four notches which are engaged by a pawl 84, mounted on an oscillating shaft 65. The said pawl is provided with a projecting arm 88, Fig. 15, which engages alternately with a cam 165 and the beveled disks 89 and 90, all fixed to the longitudinally movable shaft 56. At the opposite end of the shaft 65 is a lever arm 70, which, on the backward movement of the shaft 56, engages a beveled disk 71.

The shaft is normally prevented from rotating by means of a stop 72 engaging a notch 166 on a wheel 73 fast to said shaft, see Fig. 31. The shaft, however, operates a slide 74, through the medium of a sleeve 75, see Fig. 4, fixed thereto, and carried by the slide is a rocking arm 76, an extension of which is provided with a spring actuated pivoted dog 77 adapted to be engaged by the forward beveled end of a shouldered spring plunger 78 contained within the slide.

On the forward movement of the blank carrier and shaft 56 the spring 79 surrounding the plunger 78 is compressed by engagement with stop 85 and cocked or retained by means of a pivoted spring pawl 80. On the backward or return movement of the slide this pawl 80, when near the extreme limit of its travel, encounters a fixed stop 86 by means of which it is released from the shoulder of the plunger, which latter, under the action of the spring 79, pushes back and rides over the spring dog 77. This rocks the arm 76, frees the stop 72 from the shaft 56, and permits the latter to make a complete revolution with a resultant one-sixth rotation of the blank carrier 3.

In order to prevent the stop 72 from reengaging with the wheel 73 when the lever 76 is operated and before the said wheel has time to move the notch out of position, a pivoted arm 87 actuated by a spring 167, is carried by the lever 76 and strikes the disk 73 the instant lever 76 is moved, and prevents the stop 72 from reëntering the notch should the lever rebound.

By the rotation of the shaft 56 the cam 165 is turned through a complete revolution, by which action the pawl 84 is freed from the index wheel 69, and the latter permitted to make one quarter turn, as the pawl drops into the next succeeding notch. In this position of the shaft 60 the cam 61 permits the plunger 63 to move horizontally and operates to shift the clutch member 67 into engagement with the wheel 50, and the high speed forward movement of the blank carrier is effected by the transmission of power from shaft 40, through pinions 42 and 44, gear wheels 50 and 51, the shaft 113 to the pinion 39.

Soon after this operation has begun the beveled disk 89 comes in contact with the pawl 84 and again releases the index wheel 69, permitting the same to make another quarter revolution. By this movement the cam 61 effects the disengagement of clutch 67 with the wheel 50, while cam 62 is turned to a position in which it moves the plunger 64 and brings the clutch 68 into engagement with the wheel 49. This imparts to the blank carrier 3 the slow forward movement, which is demanded by the cutting operation to which at this time the blanks are subjected.

After this operation has progressed for a given time, the continued forward movement of the shaft 56 brings the beveled disk 90 into engagement with pawl 84 and the wheel 69 is released and permitted to make a third quarter revolution. By this operation the clutch 68 is moved from the gear 49 into engagement with the gear 45, whereupon the worm pinion 39 is caused to impart to the blank carrier a quick reverse or backward movement.

On the return movement of the shaft 56 the beveled disk 71, which, as will be seen from Fig. 8, has merely turned the pawl 70 on its bearings by its former movement, operates to lift the pawl and to again release the index wheel, permitting the latter to make its fourth quarter turn and thereby bringing the clutch 68 into its intermediate or neutral position in which it engages neither gear wheel.

It is essential that the blank carrier shall have a longitudinal movement along absolutely determined lines, and that in such movements it shall be positively held and guided. For this purpose there are on the carrier 3 projections 156 which may obviously be made adjustable, forward, backward and sidewise, if so desired, and these stops register with guide ways 157 in a stationary part of the machine. When by the means above described the blank carrier is turned roughly to the proper extent, the stops 156 engage with the guide ways and determine with great accuracy the exact position of the device in its movement toward the cutters.

By the operations and devices thus far described, the blank stock has been intermittently fed into the machine and cut off in sections. These sections have been successively taken up by the chucks of the blank carrier, intermittently reciprocated and revolved to present them to the several tools which cut the grooves and perform the other operations which they require. After the blanks have thus been successively presented to all the working or tool stations, they are ejected from the chucks and dropped into a suitable receptacle as finished pieces. The mechanism for effecting the operation of gripping and ejecting the blanks or drills from the chucks will now be described.

At the proper points on the blank carrier there are mounted tubular members 91, Fig. 16, capable of rotation, but not of independent longitudinal movement. Within these members are tubes 92 carrying at their forward ends the chucks 33 and retained in position by nuts 93 at their rear ends. On each of said tubular members 91, near the rear ends of the same, is secured a tubular casing 94, within which are pivoted levers 95 with short cam shaped ends. Over the tubular casings are sliding covers or shells 96, carrying at their inner forward ends cam surfaces 97 with inclined and flat faces.

Referring now to Figs. 11 to 13 and 21, it will be seen that on a shaft 98, which is capable of a limited longitudinal movement, there are two arms 99, one rigid and the other pivoted that extend between the forward end of the shell or cover 96 and the solid part of the blank carrier. These arms permit the blank carrier to revolve, but always lie between the shells 96 and the carrier. The sleeve 102, which carries these arms is capable of partial rotation on the shaft 98, and to hold the arms in proper position with relation to other parts, the pivoted arm is acted upon by a spring plunger 125 which acts to hold both arms in fixed position against a suitable stop.

When the blank carrier is moved forward, as for example, to cause one of the chucks to receive a blank cut from the stock, the arms 99 engage the shell 96, tending to press it backward over the tubular casing 94 and bring the cam surfaces 97 over the ends of the cam levers 95. By this means the ends of the latter are caused to engage the nuts 93, which are screwed to the tube 92 and force back the latter a short distance. This draws the chuck 33 into its casing and grips the blank which has entered it.

In order to insure the proper action of the cam levers 95 in thus locking the chuck, the rod 107, Figs. 11 and 12, carries a spiral spring 100 which engages a sleeve 101 loose on the said rod. When the blank carrier advances, a stop ring 108 compresses this spring by engagement with a pawl 103 carried by the sleeve 101. Normally the head of the pawl lies in the path of the stop ring 108, but by the advance of the latter the pawl is forced into engagement with an adjustable fixed stop 105, which turns it and causes it to slip from said ring, releasing the spring and causing the sleeve 101 to strike shoulder or projection 106. The sleeve, being capable of longitudinal movement with the shaft 98, the sudden release of the spring acting upon it imparts an impact that drives levers 99 against sleeve 96 and insures the proper engagement of the cam levers with the cam surfaces 97.

Within the tube 92 is a spring actuated sliding rod 109, Fig. 16, the rear end of which projects through the nuts 93 and the forward end of which projects through into the chuck 33 in the form of a pin 110. Near the backward limit of travel of the rod 109 its end comes into engagement with a stationary stop 111, Figs. 4 and 6, which forces the rod forward and ejects the finished blank or drill from the chuck 33.

In its movement toward the fixed stop 111, however, the shell 96, as shown in Fig. 6, is engaged by two spring actuated arms 112, carried by the fixed support for the stop 111, and by means of such arms is forced forward, whereby the cams or projections 97 are carried away from the ends of levers 95, releasing the latter and thereby loosening the finished blank in the chuck 33 and permitting it to be ejected by the rod 109.

It will be borne in mind that the blank carrier does not revolve until it is nearly or quite at its normal rear position. In operation, therefore, while the chuck containing the finished drill will be operated and its plunger advanced by the stop 111, the part 96 of the next succeeding chuck will be revolved in between the spring actuated arms 112, and in order that the stop 111 may not interfere with such movement, its end is beveled, as shown in Fig. 5, so that it will be merely turned aside by the end of rod 109. When the blank carrier has advanced and again returned this particular rod 109 will engage with the stop 111.

In the process of cutting grooves in drills, for example, it is necessary that each drill be rotated during the cutting process, as well as advanced toward the cutting tools, in order that the tool may cut spiral grooves therein. The means for accomplishing this function is illustrated in Figs. 3, 4 and 14.

The spindle 113, which carries the pinion 39, also engages with a train of gears 114, with a spindle 115 having a worm pinion 116 engaging with a gear wheel 117 on a sleeve 118 keyed to the main shaft 35 and sliding thereon. By this means a rotary motion at a very low speed is imparted to the main shaft 35 and through it by means of a gear wheel 119 to pinions 120 in the blank carrier, see Fig. 14, and this motion in connection with an advancing motion of the blank with respect to the tools causes the latter to trace a spiral path on, and to cut a spiral groove in, the blanks.

The speed of rotation and consequent pitch of the groove thus provided for, may be varied without changing the gears, by the means shown in Fig. 34, which involves a spiral groove 153 cut in the shaft 35 and a pin 152 in the stationary sleeve supporting shaft. As the shaft moves to and fro an independent movement of rotation is thus imparted to it which will be slightly greater than that imparted by the gears or less than that, according to the character and direction of the slot.

When straight grooves are to be cut in a blank, as for forming a reamer, the gears 114 are removed so that the blank moves forward without rotating, and suitably placed tools, as 127, Fig. 32, are employed to cut the grooves.

In machines of this kind, it is desirable that some means be provided whereby the depth of cut may be regulated or varied. For example, it is necessary that the tools in their normal operation shall cut grooves in the blanks which are progressively shallower in order that the spirals in the finished drills may be deeper at the cutting end of the latter than at their upper portions. To accomplish this object I employ any devices that will separate the cutting tools more or less at the desired points in their operation, the specific means adopted for the purpose being shown in Figs. 3, 24 and 25.

From the nature of the construction and mode of operation of the machine above described, it will be observed that the blank carrier and its connected parts must be fixed to the shaft 35 so far as longitudinal movement is concerned, and that said shaft moves to and fro in the operation of the machine. This movement is taken advantage of to shift the position of the tool holders and thereby vary the depth of cut made by the tools, and in the present case, where the latter are designed to cut a shallower groove at the ends, I attach to the forward end of the shaft an adjustable conical extension 121 over which travels the end of a pivoted arm 122, operating a worm pinion 123. As the shaft 35 advances, the anti-friction roller on the end of the arm or lever 122 rides up the incline or conical extension on the shaft and thereby imparts a partial rotation to the worm 123. This movement of the worm pinion is communicated to a gear 128 secured to a sleeve 129 which is free to turn through a limited arc and by such sleeve 129, to the segmental gears or quadrants 131 fixed to the heads that carry the cutting tools 130, by means of a gear 132.

In this way the tools are separated at or near the end of the travel of the shaft 35, but it is evident that by the use of suitable cams in place of the extension 121, any desired movement may be imparted to the cutters during their operation.

On the part 121 in Fig. 3 is shown a ring 135 with an inclined outer surface. In practice I use rings of different diameters to fit over this cone at the desired points corresponding to drills of different lengths, and these rings engage the end of lever 122 at the end of the movement of the shaft 35 and accelerate the movement of the lever which separates the cutters, so that at that point the latter may be moved more rapidly out of the groove before the return of the blank carrier so as not to drag in the grooves of the blank. This is an important detail in the operation of the machine.

On the end of the shaft 35 is an adjustable sleeve 133 actuated by a stout spiral spring 134, to take up the shock and prevent injury to the machine should the shaft 35 travel in its quick backward movement beyond its usual working limits, and this sleeve has a flaring end that encounters the arm or lever 122 on the backward movement of the shaft and forces it down into contact with the straight portion of the extension 121 on this shaft 35 whereby its proper subsequent movement as it travels over said extension and up the conical part of the same is assured.

The cutting tools 130 are carried by heads 136 secured to the swiveling sleeves 137 connected with the segmental gears or quadrants 131, and it will be observed that of the tools of each pair each is carried by a different head. These heads are adjustable with respect to the sleeve upon which they are mounted in order that the tools may be primarily set to cut grooves of proper depth and while any suitable means of adjustment may be employed, I prefer those shown in Figs. 25, 29 and 32.

The first tools encountered by the blank are those which effect a roughing-cut, and their adjustment not being a matter of such great nicety, may be effected by threaded rods 138 secured to the heads 136 and extending through threaded slides 139 adapted to work in oblique guides or slots 140 in the supplemental sleeves 168 keyed to the sleeves 137. The rods or pins 138 may be turned by any suitable tool to vary the position of the slides 139 in their grooves, and hence the position of the heads 136 with respect to the sleeves.

For the adjustment of the last of the groove cutting tools, which is a finishing tool, the head or heads 136, in addition to their connection with the sleeves through the pins 138, have lugs 141 connected by micrometer screws 142 with lugs 143 on the sleeve, and by this means a very fine adjustment may be secured.

Figure 1:
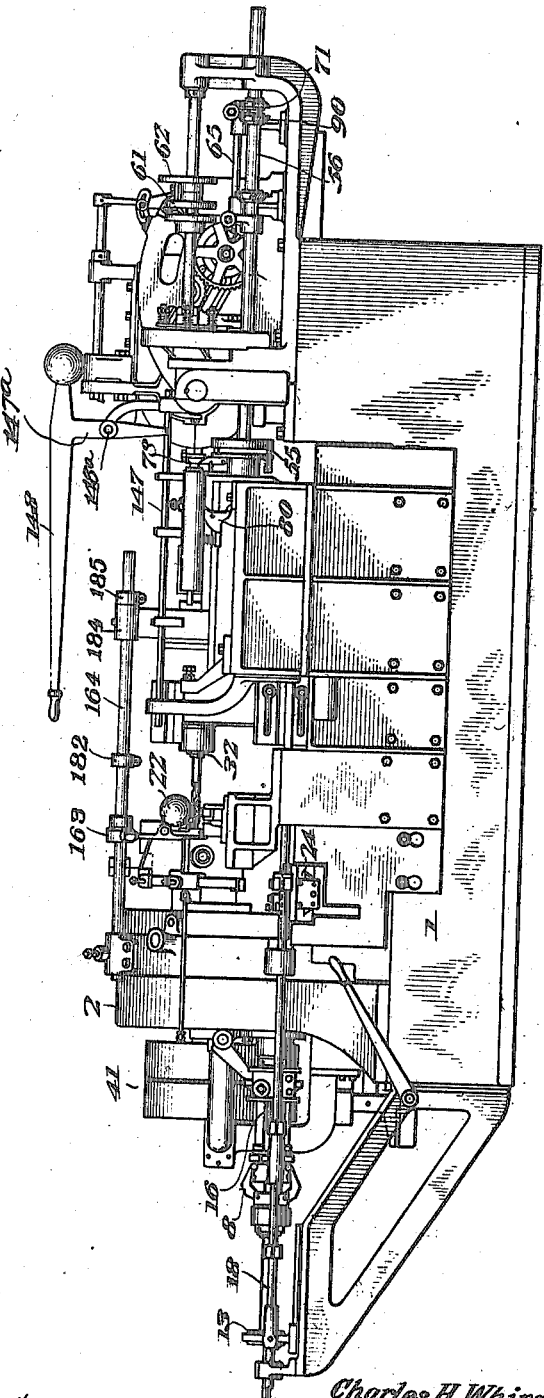
Figure 1 is a side elevation of the complete machine.

The tools with which the blanks are last brought into engagement are those indicated by 158 and 159 which form the relief cut and reduce in diameter the blank back from the edge of the grooves. Each of these tools is operated from a different head and their position is primarily determined by adjusting means similar to those hereinbefore described. It is essential, however, to separate these cutters at the end of the movement of the shaft 35 in order to get them out of contact with the blank, and for this purpose I employ the devices shown in Figs. 1 and 25.

The support for each tool indicated by 145 is adjustable in respect to an arm 160, by means of a rack and a worm 144. The two levers 160 carry anti-friction rollers 161 and are forced apart against the action of a spring 162 by means of a disk 163 on the rod 164 moved by means of lugs 182 and 183 engaged by a projection 184 on the blank carrier. This disk comes between said rollers and separates them when the rod 164 has practically reached its limit of movement toward the cutters.

With reference to this portion of the apparatus, it may be pointed out that the main driving shaft 40 gears with a large gear wheel 126 in the stationary head by means of a pinion 20. The gear wheel 126 in turn gears with the gear wheels 146 that operates the cutting tools and with the pinion 19 that imparts rotation to the stock as has heretofore been explained and as will now be understood by reference to Figs. 19, 23 and 27.

In order to stop the machine, either by hand when so desired, or automatically, in case the blank carrier travels too far in either direction or starts to turn at the wrong point, the devices shown in Figs. 9 and 10 are employed. These consist of a reciprocating rod 147 operated either by the hand lever 148 or automatically. The rod 147 carries stops 149, 150 and 151, the first and last of which determine the limits of the to and fro movement of the blank carrier, while stop 150 controls the turret turning throw-out. The latter stop prevents the blank carrier from going forward in case it should not be rotated to the proper position for the blanks to be machined by the tools. Stop 150 will be engaged by the part 76, Fig. 31, and stop the machine, unless stoy 72 is engaged in a slot in the index disk 73. The rod 147 is movably connected to arm 147$^a$ rigidly mounted upon the transverse rod 148$^a$. This rod 148$^a$ is provided with an arm or a crank 148$^b$ pivotally connected to one end of the rod 148$^c$, the other end of this rod being connected to suitable mechanism for moving the belt from the tight pulley 41 to the idler whenever said rod 148$^c$ is moved in either direction. Any form of mechanism for effecting this shifting of the belt may be employed.

In Fig. 2 is shown a device by means of which in setting up the machine its parts may be brought into the proper relation by hand. This consists of the clutch 83 on the main shaft 40, which when operative, imparts movement of the apparatus from said shaft, but by releasing this clutch the machine may be slowly operated by turning the crank 165 by hand to secure the proper relations of the parts.

In order to hold the two relieving cutter heads 169 securely on the tubular supporting arms 170, fastened to the head 2 and also to have them simultaneously adjustable horizontally and individually adjustable pivotally, so that the margin 171 on the blank is cut to the proper width by the relieving cutters 158 and 159, I employ a pivotally adjustable tubular support 172 mounted in the head 2 in the same axial plane as the supporting arms 170.

This support 172 can be moved horizontally by means of rack teeth 173 cut on the same and a pinion 174 mounted in the head 2, and can be clamped in position by a set screw 175 also mounted in the head. The relieving cutter heads 169 are secured by a flange on the same with curved slots 176, and through which studs 177 and 178 project, and which clamp the relieving cutter heads and support 172 together securely. By this means the relieving cutter heads travel horizontally together with the support when the latter is moved in or out by turning the pinion.

The individual movement of the relieving heads is produced by turning in and out the set screws 179 projecting through lugs 180 on the relieving cutter heads, and which screws press against the sides of the flange 181 of the support 172, and prevent the cutter heads from moving pivotally when both are tightened down firmly on each head, respectively.

The invention embodying the apparatus above described is not limited to the features specifically shown, and may be greatly varied. For example, the machine as a whole may be vertical instead of horizontal and the several principal movements effected at right angles to the lines described.

Again the number of work stations or points of stoppage of the blank holder is very largely immaterial. I have shown in the present case six, and in a highly organized and perfected machine such as I have selected in illustration of the improvements, this is the most advantageous number. With small drills and other tools, however, this number may be profitably reduced.

The adjustments, of the cutting tools, for example, I have not elaborated, as these are matters more related to use than to the construction of the machine. They are, however, of prime importance for by utilizing them I am enabled to graduate or vary the operations at the several work stations to meet the best conditions of practical operation. The last cutter, for example, may be adjusted to make a much shallower cut than the others and other adjustments made which may very greatly facilitate the operation of the machine and the preservation of the cutters.

Another feature of importance is the means for separating the cutters automatically. While this is shown and described as designed and used for a specific purpose, it is manifest that by means of the same or similar devices the operation of the cutters may be varied at will. That is to say, they may be caused to separate or come together in many other ways and at such times as the requirements of special work may demand.

The special means for feeding the blanks into the machine may be of any kind known in the art. Various forms of feeding mechanism are known and used. For example, the blanks may be severed in advance from a bar or rod and turned and prepared so as to be fed from a suitable magazine. Again the rod may be fed and turned by the machine itself before delivery to the chucks, and the sections may be entirely severed before introduction into the chucks or only partially severed and twisted off by the chucks themselves. All of these are old and well known devices and have long been in practical use.

What I claim is:

1. In a machine of the kind described, the combination with a tool holder and a movable blank carrier, of means for moving the cutting tools controlled by the movements of the blank carrier, and a spring seated stop rigid with the blank carrier for engaging the cutting tool moving mechanism.

2. In a machine of the kind described, the combination with a tool holder and a reciprocating blank carrier, of a shaft moving with the blank carrier, a movable spring actuated cap for the end of the shaft, and means controlled thereby for bringing into operation the devices that separate the cutting tools at the end of the stroke of the blank carrier.

3. In a machine of the kind described, the combination with a power driven shaft controlling the operation of the device, of a notched disk or wheel and a pawl for engagement with the disk and arresting the rotation of the shaft, a spiral actuated arm bearing normally on the edge of the disk and adapted to maintain the pawl in an elevated position free from the notch as soon as it is disengaged therefrom.

4. In combination with the power driven controlling shaft, of a notched disk thereon, a pawl normally engaging with the notch, and a spring actuated arm pivoted to the pawl support and bearing on the edge of the disk and adapted to maintain the pawl out of engagement with the disk when it is once raised.

5. In a machine of the kind described, the combination with a tool holder and a reciprocating blank carrier, a shaft on which the blank carrier is mounted and by the rotation of which the blanks are turned, means for rotating the shaft at a predetermined speed, a spiral groove in said shaft, and a fixed stop engaging therewith, whereby a varying movement of rotation of desired character, according to the shape of said groove, may be imparted to the shaft.

6. In a machine of the kind described, the combination with the movable stock feeder, of a stationary support, a pinion thereon and a rack on the stock feeder, whereby the throw of the latter and length of the blanks fed thereby may be varied by the adjustment of said pinion.

7. In a machine of the kind described, the combination with a rotary stock feeder, of a cutting tool for severing sections therefrom, a tool post upon which the tool is mounted and capable of movement toward and from the line of travel of the stock, a reciprocating blank carrier and a cam operated by the movement of said carrier to raise the cutting tool into engagement with the stock and sever sections of the same to form blanks for the drills or other devices, as set forth.

8. In a machine of the kind described, the combination with a reciprocating stock holder, a reciprocating blank carrier and connections between the two, of a device for limiting the length of the blanks to be cut from the advancing stock, comprising an arm movable into, and out of the path of the advancing stock, a rack for moving said arm, and a pinion rotated by the movement of the blank carrier gearing with said rack, as set forth.

9. In a machine of the kind described, the combination with a tool holder and a blank carrier capable of reciprocating motion which brings the blanks into engagement with the tools, of a cam movable with the blank carrier, means operated thereby to vary the adjustment of the tools, and a ring secured to the cam to effect a quick separation of the tools at the end of the movement of the blank carrier, as set forth.

10. In a machine of the kind described, the combination with a stationary tool holder, of a reciprocating blank carrier, means for adjusting the position of the cutting tools operated by a cam on the reciprocating blank carrier shaft, a means for returning the said means to normal position after each movement of the said shaft secured to the shaft by means of a spring so as to form a yielding connection therewith.

11. In a machine of the kind described, the combination with a reciprocating stock feeder and means for gripping the stock therein when advanced to its normal position, of a reciprocating blank carrier, a rigid rod extending from the same and engaging with the stock holder whereby the latter is advanced by the latter, and means for effecting a longitudinal adjustment of the stock feed mechanism to accommodate drills of different lengths.

12. In a machine of the class described, the combination of a reciprocating stock feeder comprising means for effecting a longitudinal adjustment and thereof means for gripping the stock therein when advanced to its normal position, a reciprocating blank carrier, a rod extending from the same and engaging with the stock holder whereby the latter is advanced by the movement of the carrier.

13. In a machine of the class described the combination with a reciprocating stock feeder, of means for effecting a longitudinal adjustment thereof comprising a rack tube located on the stock feed device, a support mounted adjacent thereto and provided with a pinion engaged with the rack tube, and means for actuating said pinion to vary the position of said rack tube.

14. In a machine of the kind described, the combination with a movable stock feeder, and means for gripping the stock for a predetermined interval of time, of a blank carrier, means actuated by the movement of the blank carrier for operating said stock feeder and gripping means and independent means for arresting the advancing movement of the stock.

15. In a machine of the kind described, the combination with a tool holder and a blank carrier movable with respect thereto, of relief cutters on the tool holder separable from the blank, means for individually adjusting said cutters angularly with respect to the blank, and means operated by the blank carrier for separating said cutters at a predetermined point in the movement of the blank carrier.

16. In a machine of the kind described, the combination with a tool holder and a blank carrier movable with respect thereto, of relief cutters carried by the holder, movable supports therefor, means for individually adjusting each of said cutters angularly with respect to the blank, and a part movable by the blank holder for forcing said supports apart at a given point in the travel of the blank carrier.

17. In a machine of the kind described, the combination of a tool holder and relief cutters mounted thereon, a reciprocating blank carrier, means for individually adjusting each of said cutters angularly with respect to the blank, means for individually adjusting each of said cutters axially thereof, and means for simultaneously adjusting said cutters longitudinally with respect to the blank.

18. In a machine of the kind described, the combination of a tool holder and relief cutters mounted on support movable thereon, a reciprocating blank carrier, means for individually adjusting each of said cutters axially thereof, and a part movable by the blank carrier for effecting a separation of the relief cutters at the end of a stroke.

19. In a machine of the kind described, the combination of a tool holder and relief cutters mounted on supports movable thereon, a reciprocating blank carrier and means for individually adjusting the relative angular and lateral positions of each of said cutters.

20. In a machine of the kind described, the combination with a tool holder, relief cutters, heads for carrying such cutters and rotatably mounted on the tool holder, means for individually rotating each of said heads to space the relief cutters, and means for individually adjusting the relative lateral positions of the relief cutters.

21. In a machine of the kind described, the combination with a relatively stationary tool holder and a blank carrier movable with respect thereto, of relief cutters on the tool holder, means for individually adjusting each of said cutters angularly, and means for adjusting the same longitudinally with respect to the machine to compensate for different lengths of blanks.

22. In a machine of the class described, the combination of fixed tool carrier, relatively stationary heads rotatably mounted upon said tool carrier, clearance cutters provided with shafts rotatably mounted in said rotating heads, means for individually adjusting each of the said rotating heads to determine the character of cut, means for moving the cutters axially of their shafts toward and from the blank, and means for rotating each of said cutters comprising a power-shaft the axis of which coincides with the axis of each rotatable head, and means for operatively connecting the cutter shaft with the power shaft.

23. In a machine of the kind described, the combination with a reciprocating blank carrier, a blank holding chuck rotatably mounted in said carrier, a tool head, a rotary cutting tool mounted in said head, a rotary shaft, and means while the cutting tools are acting upon the blank and during the advancing movement of the carrier for transmitting a variable rotary movement from said shaft to said blank holding chuck to cause the cutting tool to cut a spiral groove of varying pitch.

In testimony whereof I affix my signature in the presence of two subscribing witnesses.

CHARLES H. WHIPPLE.

Witnesses:
 WILSON W. MEEM,
 HARRY O. BULKLEY.